March 17, 1970     S. W. BIRCH     3,500,842

AIR INTAKES FOR GAS TURBINE JET PROPULSION ENGINES

Filed July 12, 1968

Inventor
STANLEY WILLIAM BIRCH

By
Cushman, Darby & Cushman
Attorneys

United States Patent Office 3,500,842
Patented Mar. 17, 1970

3,500,842
AIR INTAKES FOR GAS TURBINE JET
PROPULSION ENGINES
Stanley William Birch, Spondon, Derby, England, assignor to Rolls-Royce Limited, Derby, England, a British company
Filed July 12, 1968, Ser. No. 744,576
Claims priority, application Great Britain, Aug. 31, 1967, 39,791/67
Int. Cl. B64d 33/02; B64c 15/12; F02b 27/00
U.S. Cl. 137—15.1                                    3 Claims

ABSTRACT OF THE DISCLOSURE

An air intake for a gas turbine jet propulsion engine comprising a member having inner and outer peripheries formed by two eccentric circles and in any radial section therethrough, said any section is convex, the convex shape being partly elliptical in the plane of said section when it passes through the broadest part of the annulus defined by the two eccentric circles, and changing symmetrically about the line of said section to semi-circular at the narrowest part of said annulus.

---

This invention relates to air intakes for gas turbine jet propulsion engines.

According to the present invention, there is provided an air intake for a gas turbine jet propulsion engine comprising a member having inner and outer peripheries formed by two eccentric circles and in any radial section therethrough, said any section is convex, the convex shape being partly elliptical in the plane of said section when it passes through the broadest part of the annulus defined by the two eccentric circles, and changing symmetrically about the line of said section to semicircular at the narrowest part of said annulus.

Means are provided whereby the member may be rigidly attached to the upstream end of a gas turbine jet propulsion engine, that is, upstream with regard to the air flow through the engine.

Preferably, though not restrictively so, the ratio of proportions of the major axis to the minor axis of the semi-elliptical portion at the broadest part of said annulus, is in the order of 2:1.

Preferably, the radius of the semi-circular portion on said narrowest part of the annulus, equals half the minor axis of said elliptical portion.

The invention will now be described with reference to the accompanying drawings in which.

Figure 1:
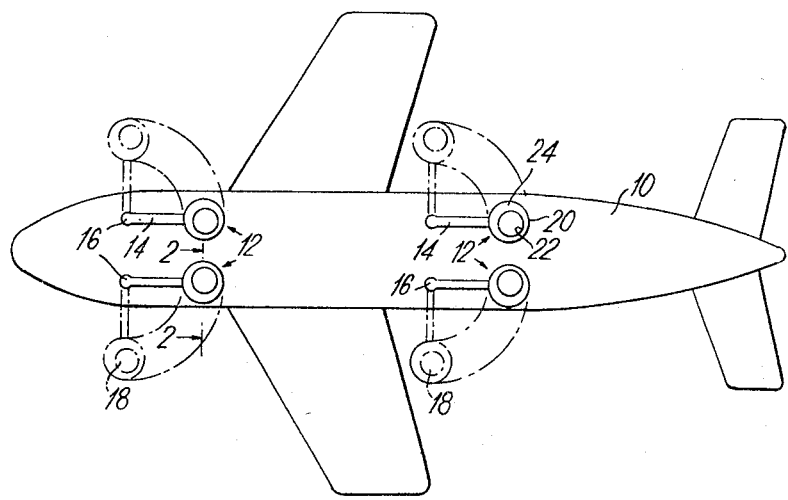
FIG. 1 is a plan view of an aircraft in which are mounted gas turbine jet propulsion engines provided with intakes according to the present invention.

In FIG. 1 an aircraft 10 has gas turbine jet propulsion engines 12 mounted within its fuselage. Engines 12 have their axis vertical and are pivotable on arms 14 about points 16, to a position 18 as shown in dotted lines.

Engines 12 have their axes vertical so as to provide vertically directed thrust whereby the aircraft can rise or land vertically. Said engines may also be pivotable about arm 14 so that the thrust may be directed forwardly or rearwardly, whereby transition between horizontal and vertical flight of the aircraft is obtained.

It will be seen in FIG. 1 that the air intake for each engine is defined by outer periphery 20 and inner periphery 22. Both peripheries are circular and are eccentrically spaced thus defining between them an annulus 24 of differing radial dimensions.

Figure 2:
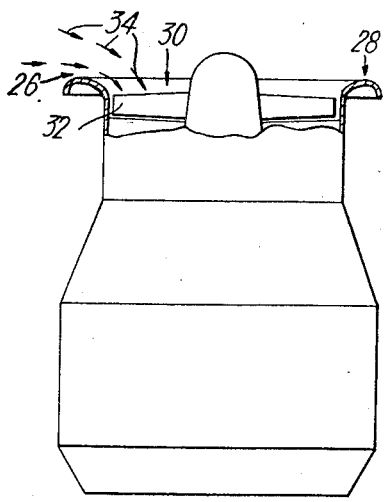
FIG. 2 is a part section on line 2—2 in FIG. 1.

A common section taken on a line through the broadest and narrowest parts of annulus 24, as on line 2—2 in FIG. 1 and depicted at FIG. 2, shows that the broadest part of the annulus has a partly-elliptical periphery 26 and that the narrowest part 28 is semi-circular. The remainder of the intake periphery, half of which is indicated at 30, changes symmetrically about line 2—2, from part ellipse 26 to semicircle 28.

Each engine 12 is mounted so that when it is pivoted to the position indicated at 18, part 26 of the intake is in the upstream position, that is, upstream in relation to the direction of airflow past the aircraft when in forward flight. Thus when the aircraft is flying forwardly, but it is required to land engines 12 are pivoted about axes 16 to the positions 18 shown in dotted lines. Air which flows across the tops of the intakes will attach itself to the semi-elliptical part 26 and will be caused to enter the engine compressor 32 as indicated by arrows 34. Air which flows over part 26 will be sucked in by compressor 32 as the compressor rotates in known manner.

Thus it will be seen that although the flow of air through the engine is normal to the flow of ambient air the semi-elliptical part 26 of the intake ensures a substantially even distribution of air across the compressor face.

If part 26 were semi-circular, the air would tend to break away and cause bad distribution.

It has been found by experiment, that, at least in so far as the invention is applied in the specific example, that a major axis to minor axis ratio in the order 2:1 in part 26, gives optimum result with regard to airflow into the engine.

A further advantage of the present invention is that an efficient air intake structure is obtained with the minimum weight and volume penalties.

I claim:
1. An air intake for a gas turbine jet propulsion engine comprising a member having inner and outer peripheries formed by two eccentric circles and in any radial section therethrough, said any section is convex, the convex shape being partly elliptical in the plane of said section when it passes through the broadest part of the annulus defined by the two eccentric circles, and changing symmetrically about the line of said section to semi-circular at the narrowest part of said annulus.

2. An air intake as claimed in claim 1 wherein the ratio of the major axis to the minor axis of the part ellipse at said broadest part of the annulus is 2:1.

3. An air intake as claimed in claim 1 wherein the radius of the semi-circle at said narrowest part of the annulus, equals half the minor axis of said part ellipse.

No references cited.

ALAN COHAN, Primary Examiner

U.S. Cl. X.R.
244—56